J. KINCAID.
FLUID PRESSURE IMPACT ENGINE.
APPLICATION FILED DEC. 21, 1908.

962,511.

Patented June 28, 1910.

WITNESSES:
Charles H. Wagner,
H. Woodard

INVENTOR
John Kincaid,
BY
Fred G. Dieterich
ATTORNEY

UNITED STATES PATENT OFFICE.

JOHN KINCAID, OF VANCOUVER, BRITISH COLUMBIA, CANADA.

FLUID-PRESSURE IMPACT-ENGINE.

962,511.

Specification of Letters Patent. Patented June 28, 1910.

Application filed December 21, 1908. Serial No. 468,597.

*To all whom it may concern:*

Be it known that I, JOHN KINCAID, citizen of the Dominion of Canada, residing at Vancouver, in the Province of British Columbia, Canada, have invented a new and useful Improvement in Fluid-Pressure Impact-Engines, of which the following is a specification.

This invention relates to a fluid pressure rotary engine of that class wherein a jet of water or other fluid under pressure is directed upon the circumference of a rotatable wheel provided with buckets or the like, and my improvement comprises the provision of two equal and similar wheels rotatable in a common plane with their outer circumferences in contact, by which means I am enabled by the provision of comparatively shallow recesses in each wheel, to furnish a succession of water holding receptacles where the recesses converge approaching the line of contact between the two wheels, which receptacles are favorable to the impact of a jet directed toward the line of contact and to the absorption of its energy, and which being shallow will offer no resistance to the delivery of the water therefrom, as the recesses recede from one another after passing the point of contact. By this means I am enabled to derive more energy from the fluid jet than can be done when the pockets are provided in one wheel alone, as such if made efficiently receptive do not permit the water to deliver from them as freely as they should.

Figure 1:
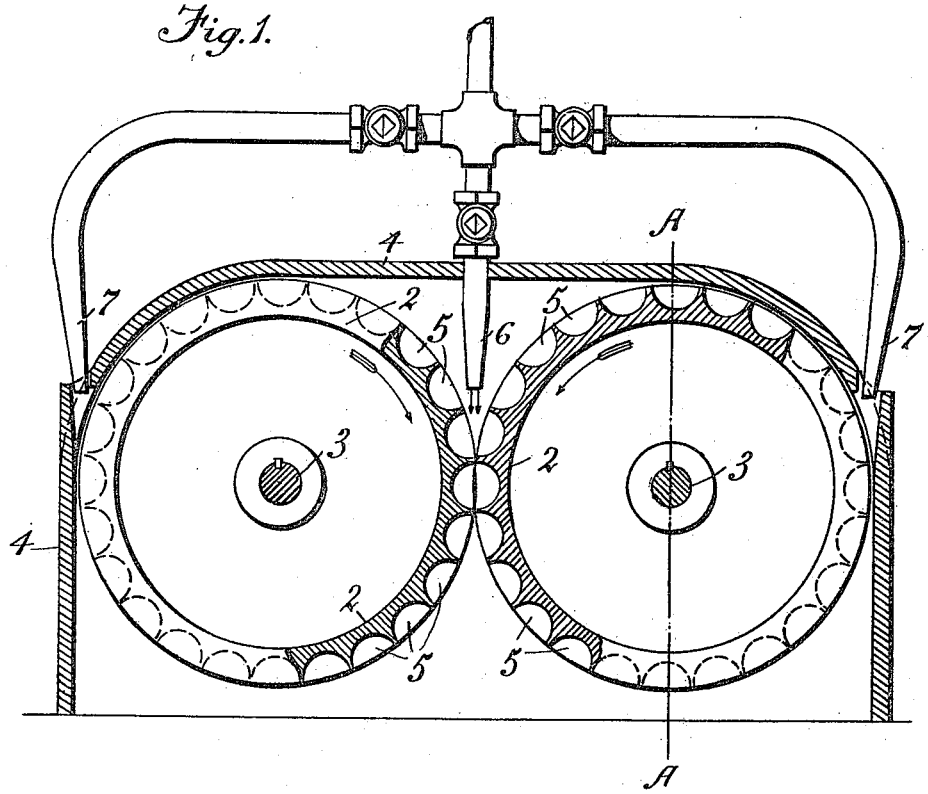
Figure 2:
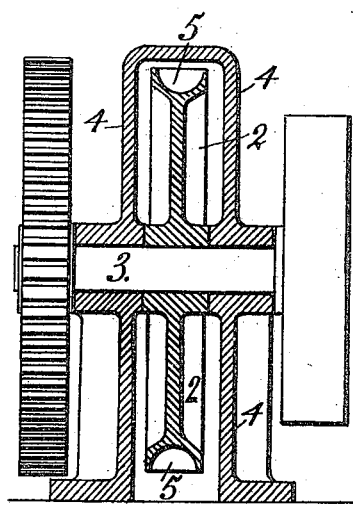

The invention is particularly described in the following specification, reference being made to the drawings by which it is accompanied, in which:

Figure 1 is a vertical section and part elevation on planes parallel to that of rotation and, Fig. 2, is a cross section on the line A A in Fig. 1.

In these drawings 2 represents separate wheels secured to parallel axles 3 on which the wheels are rotatable in contact with one another in any suitable bearings which may form a part of or be secured to a casing 4, which incloses the wheels and forms the frame by which the engine is secured to its foundation, the under side of this casing 4 being preferably left open for the free delivery of the water when it has finished its work. The circumferences of these wheels are furnished with a series of preferably hemispherical recesses 5 which are symmetrical in relation to the circumference of the wheel.

The wheels rotate under the impact of a jet of water or other fluid under pressure which jet is directed through a nozzle 6 to the line of contact, and tangential to both wheels.

The recesses 5 of the two wheels should be opposed throughout their rotation, which opposition may be maintained by gears secured to the axles of the wheels outside of the casing, or by other suitable means that will insure their rotating in unison. Under these conditions the recesses 5 of the two wheels as they approach one another toward the line of contact form jointly, as they come within the scope of the jet, holding receptacles the form of which is favorable for the reception of the fluid and the absorption of its energy, and after passing the point of contact, as the recesses recede from one another, the water will drop from them freely without requiring to be driven out by centrifugal force, which action would necessarily absorb energy from the wheel.

The symmetry of the recesses 5 in relation to the circumference of the wheels, enables jets to be applied to the sides of the wheels opposite to their line of contact for the reversal of the engine when required, and as in this application there are no opposed recesses to form holding receptacles, the nozzles 7 may be directed slightly inward as shown in Fig. 1.

A number of opposed wheels may be provided on each shaft 3, each pair being furnished with separate jets by which the power of the engine may be increased without varying the form and dimensions of the various parts, and which will enable the power of an engine so provided to be varied to the requirements of its work, as one, two or more jets may be made use of as called for. The power may be taken from a belt pulley 10, or a gear secured to one of the axles 3, or pulleys may be furnished on both wheels and the belt passed around them in such a manner that it will serve to insure their rotation in unison.

Having now particularly described my invention and the manner of its construction and application, I hereby declare that what I claim as new and desire to be protected in by Letters Patent, is:

In a fluid pressure impact engine, the combination of two equal wheels rotatable in a common plane with their outer circumferences in contact each wheel being provided with hemi-spherical recesses around its circumference, and a nozzle through which a jet of fluid under pressure may be directed at the line of contact between the two wheels.

In testimony whereof I have signed my name to this specification in the presence of two subscribing witnesses.

JOHN KINCAID.

Witnesses:
ROWLAND BRITTAIN,
CLIVE S. CARMAN.